United States Patent
Dunaway et al.

[11] Patent Number: 6,036,937
[45] Date of Patent: Mar. 14, 2000

[54] METHOD FOR PRODUCING ZINC BROMIDE

[75] Inventors: Weyman H. Dunaway, The Woodlands; David J. Hanlon, Magnolia, both of Tex.; Lyle H. Howard, W. Mephis, Ariz.; Jeffrey S. McKennis; Raymond D. Symens, both of The Woodlands, Tex.

[73] Assignee: Tetra Technologies, Inc., The Woodlands, Tex.

[21] Appl. No.: 09/195,761

[22] Filed: Nov. 18, 1998

[51] Int. Cl.[7] .................................................. C01B 9/04
[52] U.S. Cl. .................................. 423/491; 422/227
[58] Field of Search .................. 423/491; 422/234, 422/235, 227

[56] References Cited

U.S. PATENT DOCUMENTS

| | | | |
|---|---|---|---|
| 220,449 | 10/1879 | Wahl et al. | 423/491 |
| 1,483,852 | 2/1924 | Rosenstein | 423/491 |
| 2,415,346 | 2/1947 | Farr et al. | 423/491 |
| 3,297,464 | 1/1967 | Wilferth | 423/491 |
| 3,723,075 | 3/1973 | Stevenson et al. | 423/495 |
| 4,111,991 | 9/1978 | Garrison | 423/491 |
| 4,136,056 | 1/1979 | Zielke | 423/491 |
| 4,138,354 | 2/1979 | Sochol et al. | 252/182 |
| 4,248,850 | 2/1981 | Keblys | 423/491 |
| 4,514,374 | 4/1985 | Kirsch | 423/497 |

FOREIGN PATENT DOCUMENTS

| | | | |
|---|---|---|---|
| 4-338117 | 11/1992 | Japan | 423/491 |
| 947051 | of 1982 | U.S.S.R. | 423/491 |
| 91/03425 | 3/1991 | WIPO | 423/494 |

*Primary Examiner*—Ngoc-yen Nguyen
*Attorney, Agent, or Firm*—Jo Katherine D'Ambrosio

[57] ABSTRACT

A method for making zinc bromide from metallic zinc and bromine comprising contacting zinc with bromine dissolved in a reaction solvent containing a metal halide salt. During the practice of this method, the reaction temperature is maintained at less than 60° C. The reaction solvent preferably comprises an alkali, alkaline earth or transition metal halide and the halide salt preferably comprises a chloride or a bromide. One preferred method includes the step of recirculating the zinc bromide product stream back to the reaction vessel. The reaction vessel can comprise either a one stage or a multiple stage reactor. The resulting product stream comprises a high density zinc bromide solution.

17 Claims, 3 Drawing Sheets

METHOD FOR PRODUCING ZINC BROMIDE

FIELD OF THE INVENTION

The present invention relates to a method for producing zinc bromide, particularly to a method for producing zinc bromide from metallic zinc and bromine.

BACKGROUND OF THE INVENTION

Zinc bromide is a widely used compound in chemical, petrochemical and process industries, photography, and manufacturing of synthetics such as rayon. Because commercial usage of zinc bromide is increasing, large-scale production of the compound is necessary.

The reaction of metallic zinc with halides to produce a zinc halide was reported over 150 years ago. Wahl et al., U.S. Pat. No. 220,449, dated Oct. 7, 1879, disclose production of impure zinc chloride by dropping "dross", which contains zinc-iron alloy resulting from galvanizing iron, into aqueous muriatic acid (hydrochloric acid). These early reactions were reported to be sluggish, presumably owing to layers of zinc oxide on the surface. More recently, zinc bromide was prepared by the addition of moist bromine to hot zinc as disclosed in R. Pajeau, *Bull Chim. Soc. Fr.* [5], 6, 1187–91 (1939) and by the reaction of bromine vapor in a stream of nitrogen with molten zinc disclosed in K. Niwa, *J. Fac. Sci.* Hokkaido Univ. [1], 3 (1), 17–33 (1940). These reactions did not include solvent, were conducted at high temperatures and were accompanied by the presence of excess quantities of free bromine. Such reactions are impractical for large-scale production of zinc bromide, especially from a health and environmental standpoint. Bromine is an extremely toxic and corrosive chemical, especially in its free form as a liquid or as a gas (boiling point 59° C.).

A. Raynaud, *Bull. Chim. Soc. Fr.*, [4], 39, 195–201 (1926) teaches that bromine and zinc do not react with each other directly and require the formation of the intermediates ZnO and HBr.

The process of preparing metal bromides from free metals and bromine has been reported in patent literature. For example, U.S. Pat. No. 4,138,354 to Sochol et al. discloses a process for preparing manganese and cobalt bromide from manganese, cobalt bromide, and bromine. The process depends upon an oxidation-reduction reaction between manganese and the cobaltous ion and the subsequent reaction of the generated cobalt with aqueous bromine. U.S. Pat. No. 4,248,850 to Keblys teaches the preparation of metal bromides from a basic metal compound and bromine in the presence of formaldehyde as a reducing agent. U.S. Pat. No. 4,514,374 to Kirsch teaches the use of a lower alkanol as a reducing agent.

U.S. Pat. No. 1,483,852 to Rosenstein discloses the production of zinc chloride by reacting lead-zinc alloy in water with chlorine gas. Lead metal is alloyed with the zinc metal, and the lead serves as a catalyst for the reaction of the chlorine with the zinc. Chlorine reacts with the zinc-lead alloy to produce zinc chloride. Heat from the reaction causes water to evaporate as steam. The concentration of zinc chloride is controlled by the rate of water dropping or flowing through zinc particles in a zinc-receiving pipe. The Rosenstein disclosure states that the process cannot be worked with pure zinc.

U.S. Pat. No. 2,415,346 to Farr discloses a process of making halogen salts of metals. Zinc bromide is made by reacting zinc chloride with hydrobromic acid under boiling temperature conditions. In the '346 process of making metal bromides, a metal salt of the type $MY_n$ is reacted with an aqueous medium of hydrogen bromide, where M is the desired metal, Y is a halogen of lower atomic weight than bromine, and n is the valence of M. The metal salt is treated with a substantially equivalent quantity of the acid in an aqueous solution with sufficient water to form a constant boiling mixture.

U.S. Pat. No. 3,723,075 to Stevenson et al., discloses that aluminum tribromide is made by reacting metallic aluminum with bromine in a stirred liquid reaction medium consisting essentially of molten aluminum tribromide at temperatures of 100° C. to 140° C.

None of the references teach or suggest a method for manufacturing zinc bromide from metallic zinc and bromine solution on a large scale, commercial basis. Consequently, there remains a need for an inexpensive, and simple method for rapidly manufacturing zinc bromide in large quantities. The problem of zinc bromide production without the harmful production of free gaseous bromine and hydrogen must also be addressed.

SUMMARY OF THE INVENTION

During the method of this invention, metallic zinc is reacted directly with bromine in a solvent at temperatures preferably about 60° C. or below, thereby avoiding many of the problems associated with high temperature processes, for example, liberation of gaseous bromine and significant amounts of hydrogen. The method of this invention allows large-scale production of zinc bromide directly from its elements at temperatures below the boiling point of bromine, thereby eliminating any need for a condenser and significantly reducing the liberation of free bromine into the atmosphere. The product is essentially color free. This direct reaction can be accomplished with relatively straightforward equipment in a rapid, safe and efficient manner. During this method, the heat of formation of zinc bromide is easily dissipated with limited cooling of the system.

Broadly, the method for making zinc bromide according to this invention comprises: (a) dissolving bromine in a reaction solvent comprising a metal halide salt; and (b) contacting metallic zinc with the resulting bromine solution to form a zinc bromide solution. Preferably, the reaction solvent is aqueous. The metal of the metal halide salt can be selected from the group consisting of alkali metals, alkaline earth metals, transition metals and combinations thereof. The preferred metal halide salt is selected from the group consisting of sodium, potassium, calcium, zinc and a combination thereof. The halide of the metal halide salt is preferably selected from the group consisting of chloride and bromide. In the practice of the method of this invention, the preferred reaction temperature is maintained at less than about 60° C.

Bromine can be added continuously to the reaction solvent. Advantageously, a portion of the zinc bromide solution resulting from (b) is recycled to (a). Preferably, the further step of concentrating the zinc bromide solution is taken. Zinc bromide solution can be concentrated until zinc bromide is precipitated. In one aspect of this invention, the zinc bromide solution is concentrated by evaporation. Alternatively, the percentage of zinc bromide in solution is increased by recycling the zinc bromide solution from (a) continuously through the metallic zinc in (b).

Another preferred method for making zinc bromide comprises: (a) dissolving bromine in a reaction solvent; (b) feeding the reaction solvent to a reaction vessel containing metallic zinc; (c) contacting the metallic zinc with the reaction solvent to form a zinc bromide solution; (d) obtaining a zinc bromide product stream from the reaction vessel; and (e) recirculating at least a portion of the zinc bromide solution back to the reaction vessel as the reaction solvent in (a)–(c). Preferably, the reaction solvent is aqueous. More preferably, the bromine is dissolved in the presence of an aqueous solution of a halide ion. A preferred reaction solvent comprises a base metal halide.

In one aspect of this invention, the reaction vessel comprises a single stage reactor. Alternatively, the reaction vessel comprises at least two stages and the reaction solvent is recirculated after the first stage. Advantageously, the product stream is essentially free of bromine and preferably, the bromine in the product stream has an equilibrium concentration with air of 1 ppm or less.

DETAILED DESCRIPTION OF THE INVENTION

In the method of this invention, zinc bromide is produced directly from its elements. Straightforward equipment is utilized, and, because temperatures are maintained at less than 60° C., limited cooling of the system is required. The problem of release of harmful or potentially explosive gases is addressed, resulting in the minimal release of gaseous bromine during the reaction and significantly reduced production of hydrogen gas, thereby improving health, environmental and safety conditions. Large scale production of zinc bromide can be accomplished both rapidly and safely.

During one method of this invention, zinc metal is contacted with a reaction solvent capable of dissolving zinc bromide and is treated with bromine in either a batch-wise or continuous mode. The bromine is preferably dissolved in the reaction solvent prior to or concurrently with the zinc metal-reaction solvent contact. The resulting zinc bromide which dissolves in the reaction solvent can be drawn off in solution in a batch mode or recycled along with the reaction solvent and bromine.

Figure 1:
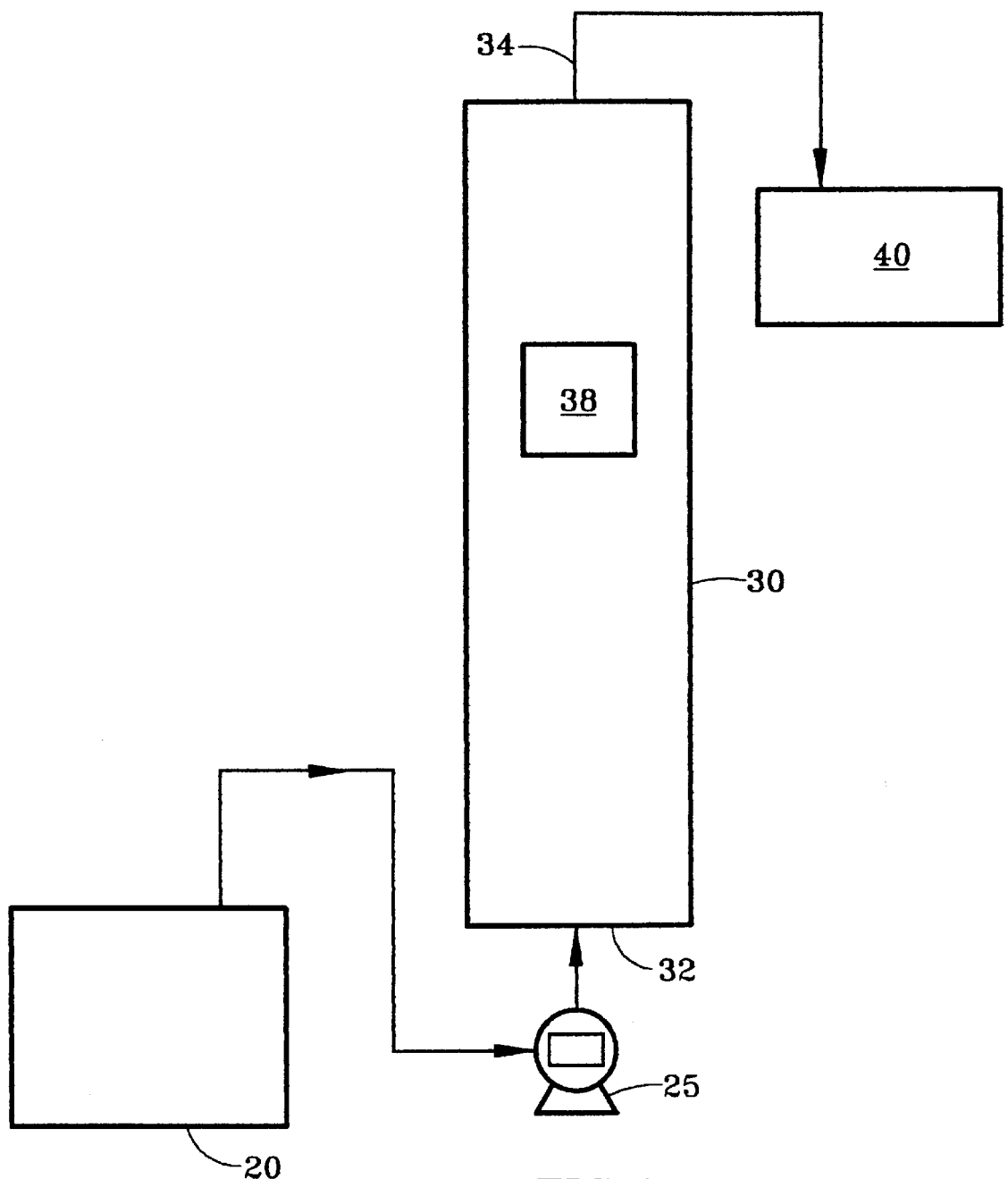
FIG. 1 is a schematic of a method of batch production of zinc bromide according to the present invention.

Zinc metal, preferably zinc shot, is placed within a reaction vessel. In one embodiment, zinc shot is suspended in a reaction solvent and bromine is added directly to the reaction solvent. Alternatively, bromine can be dissolved in the reaction solvent fed into the reaction vessel. In still another alternative, bromine can be added to the reaction solvent in the vessel to which zinc is then added. Preferably, the feed solution comprises bromine dissolved in an aqueous reaction solvent. In a preferred method as depicted in FIG. 1, the feed solution is pumped from a feed tank 20 to the reaction vessel bottom 32 or column and the reaction product stream 40 removed from the column top 34. In the practice of this invention, zinc, bromine and reaction solvent can be added continuously. Preferably, the bromine is added continuously at such a rate so as to maintain the reaction temperature below about 60° C. or the boiling point of bromine. A preferred temperature range is from about 30° C. to about 60° C. although temperatures below 30° C. are within the scope of this invention. The residence time of the bromine solution in contact with the zinc metal is preferably long enough so that substantially complete reaction of the bromine with the zinc occurs, leaving the reaction solvent effluent eventually free of elemental bromine and enriched in zinc bromide. Conveniently, no scrubber or bromine trap is required to prevent the release of bromine from the reaction solvent effluent into the environment because the reaction of the bromine to bromide salt is essentially complete.

In one embodiment, the reaction solvent is aqueous. Zinc bromide is formed as the direct reaction of the zinc and bromine and is dissolved in the reaction solvent. The reaction solvent feed can comprise halide ions to improve solubility of the bromine in the reaction solvent. One preferred source of halide ions is a base metal salt. The base metal can be selected from the group comprising alkali metals, alkaline earth metals and transition metals. A more preferred metal comprises a metal selected from the group consisting of zinc, calcium, sodium, potassium, cesium, lithium, barium, magnesium, strontium and combinations thereof. The preferred halide ions can comprise bromide or chloride, but iodide ions are also within the scope of this invention. Preferably, the reaction solvent comprises a base metal salt selected from the group comprising zinc bromide, calcium bromide, zinc chloride, calcium chloride and combinations thereof. In one preferred practice of this method, the reaction solvent comprises aqueous zinc bromide. Alternatively, the reaction solvent initially comprises aqueous calcium bromide alone or in combination with zinc bromide. The use of aqueous solutions of halide salts such as those of zinc and calcium leads to the direct formation of high-density brine solutions and permits higher concentrations of bromine to be used.

For the purpose of illustration, reference is made for convenience hereafter to aqueous zinc bromide as the reaction solvent with the understanding that other suitable reaction solvents may also be used. The concentration of the base metal salt within the solvent can vary widely during the method of this invention. However, a preferred concentration at the start of the reaction is within a range from about 0.001 weight percent base metal halide up to saturation. The preferred bromine concentration is within a range of from about 0.01 to 40 weight percent, more preferably from 0.1 to 10 weight percent. The specific feed solvent concentration of bromine will depend on the solubility of bromine in the zinc bromide brine, the residence time of the solvent in contact with the zinc metal, temperature, reaction kinetics and the like.

Preferably, the zinc bromide resulting from the reaction of this invention is concentrated, and, if desired, concentrated until the zinc bromide is precipitated. Concentration can occur by evaporation of the solution. Alternatively, zinc bromide can be concentrated by increasing the percent of zinc bromide in solution by recycling at least a portion of the zinc bromide product stream back to contact with the metallic zinc. In one preferred method, the reaction solvent is an aqueous bromine/zinc bromide solution which is recycled continuously through the zinc until the desired concentration of zinc bromide is attained.

Figure 2:
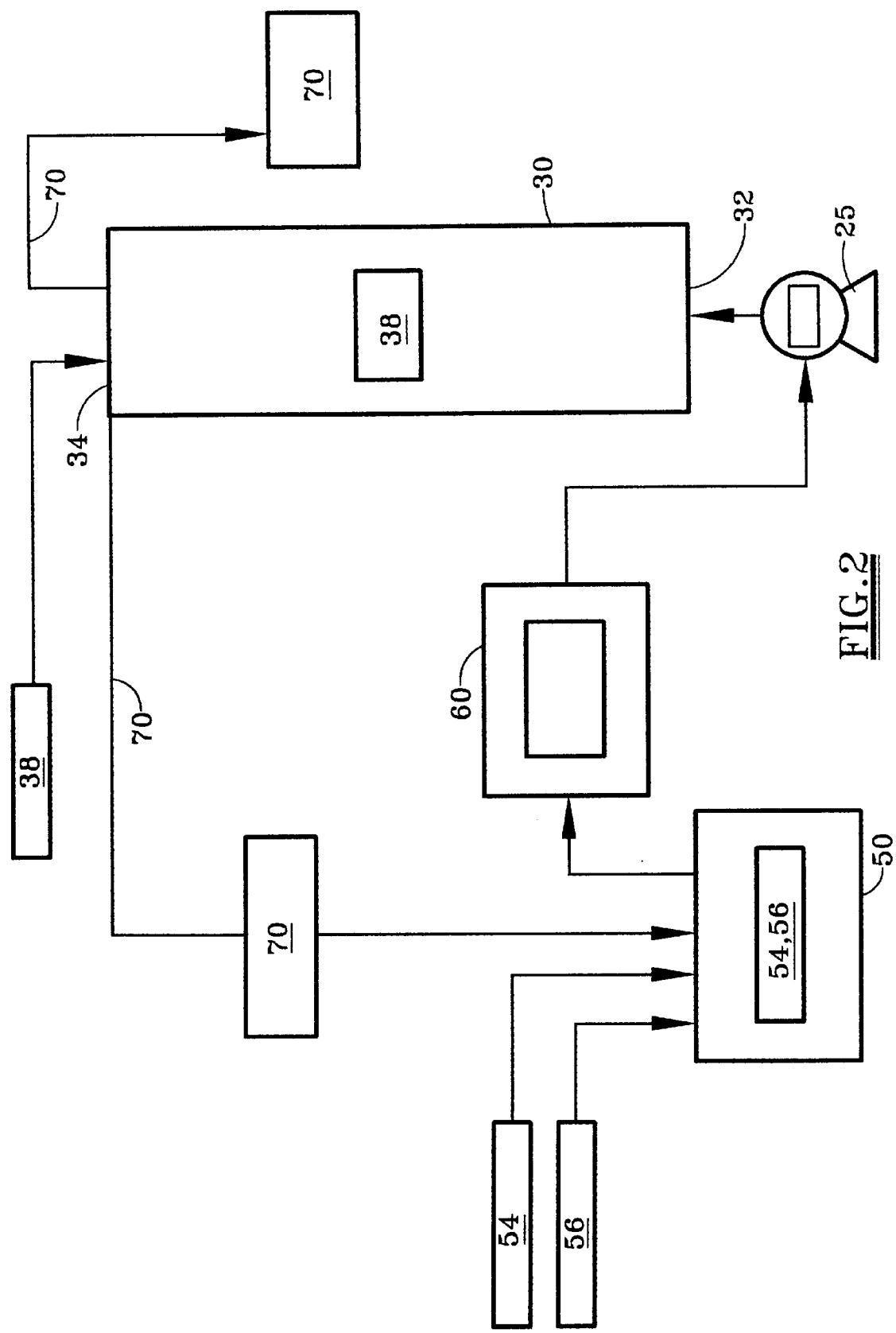
FIG. 2 is a schematic of a method of continuous production of zinc bromide according to the present invention.

FIG. 2 illustrates one preferred method of recycling the zinc bromide back into the reaction. During this method, bromine 54 is dissolved in the reaction solvent in a feed mixing tank 50. The reaction solvent 56 containing the dissolved bromine is fed into the reaction vessel 30 or column containing metallic zinc 38, zinc shot for example. Alternatively the bromine 54 can be piped in directly to the solvent in the reactor vessel 30. The metallic zinc 38 is contacted with the bromine/reaction solvent solution to form zinc bromide. The zinc bromide product stream 70 is obtained from the reaction vessel top 34. A portion of the product stream 70 is recirculated to the mixing tank 50. Preferably, makeup bromine 54 is continuously added to the tank 50 for mixing with the recycled zinc bromide that has been recirculated from the vessel top 34. The mix of recycled zinc bromide solution 70, reaction solvent 56 and bromine 54 can be passed through a heat exchanger 60 to remove some of the heat of reaction from the warm brine/zinc bromide solution, before being pumped via pump 25 to the reaction vessel 30. Additional zinc shot 38 may be added to the vessel top 34 continuously or periodically. Preferably, the temperature throughout the reaction is maintained below about 60° C. In a more preferred embodiment, the reaction temperature is maintained within a range of about 0° C. to about 50° C., especially 30–50° C.

The equipment used during the practice of this method is known in the art. The reaction vessel for continuous production of zinc bromide can be a one-stage vessel 30 as depicted in FIG. 2 or a two-stage vessel 40 illustrated in FIG. 3. If a one-stage reaction vessel 30 is used, the reaction solvent and bromine are combined in a feed and recycling mixer 50 and pumped from the mixer 50 into the vessel bottom 32. The system can also be operated without the mixer 50. Preferably the resulting product is collected at vessel top 34. The reverse can also be the case when the reaction solvent and bromine are pumped to vessel top 34 and collected from the vessel bottom 32. The product stream 70 can be split so that a portion of the product stream is recycled back to the tank 50 until the desired concentration of zinc bromide is achieved. The preferred product stream will comprise approximately 65% zinc bromide essentially free of elemental bromine with no bromine detectable in the air above the reactor, e.g. less than 1 ppm by volume in the air. The actual concentration of bromine in the product zinc bromide stream will depend on the temperature, zinc bromide concentration, etc. This zinc bromide as produced is essentially color free.

Figure 3:
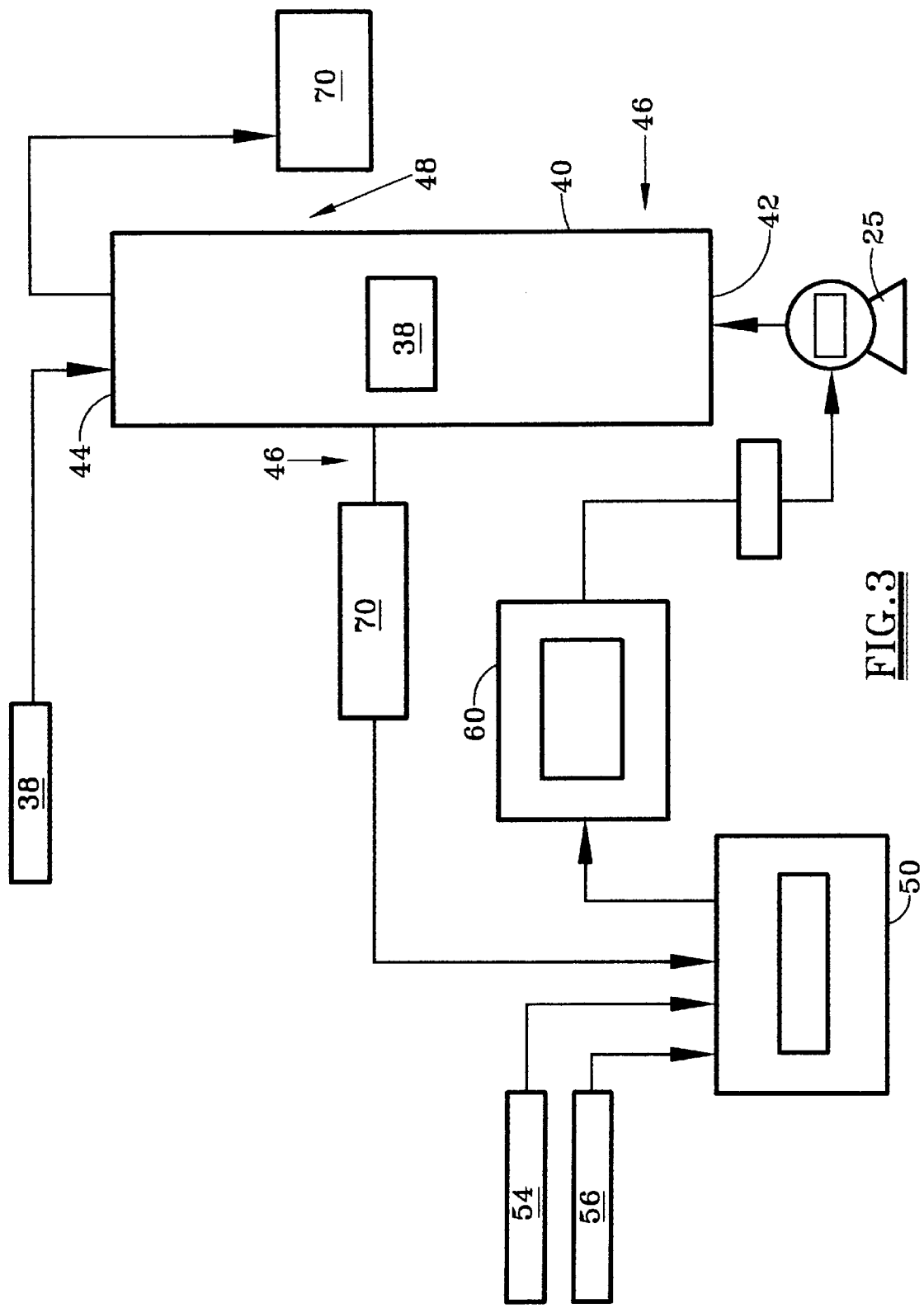
FIG. 3 is a schematic of a method of continuous production of zinc bromide using a two stage reactor according to the present invention.

A two stage continuous reaction process is illustrated in FIG. 3. As in the one-stage process of FIG. 2, the reaction solvent and bromine are mixed in mixing tank 50 and pumped into the bottom of the reaction vessel 42. The reaction vessel 40 is a two-part vessel comprising an upper section 48 and a lower section 46. At least a proportion of the zinc bromide solution resulting from contacting the zinc shot with the bromine/reaction solution is drawn from the lower section 46 and recycled back to the mixer 50. Any remaining product stream enters the upper section 48 of the reaction vessel 40 for continued reaction with the zinc shot and the resulting product stream can be drawn off from the top of the vessel top 44.

EXAMPLES

Example 1

Production of Zinc Bromide Solution from Zinc Metal, Bromine and Water.

The apparatus consisted of a glass chromatography column, feed flask, and chemical metering pump as shown in FIG. 1. The column used for this experiment was a commercially available 12-inch tall column having an inside diameter of 1 inch. The column was filled with 3–5 mm zinc shot from Fisher Scientific.

The bottom of the column was fitted with an adapter that allowed liquids to be pumped into the column, but retained the zinc shot inside the column. The top of the column was fitted with an adapter that allowed gas and liquid to leave the column separately. Feed samples were prepared by weighing bromine, water and zinc bromide solution into the feed flask. The bromine and water were mixed with zinc bromide solution to completely dissolve the bromine. The solution of bromine, water and zinc bromide was pumped from the feed flask into the bottom of the column.

A feed solution containing 24.4% zinc bromide and 4.8% bromine was fed to the column at the rate of 2.0 ml/min. The product solution was 30.8% zinc bromide and 0.01% bromine.

Example 2

Production of Zinc Bromide Solution from Zinc Metal, Bromine and Water Using Higher Bromine Concentration.

The same apparatus as Example 1 was fed solution containing 20.6% zinc bromide and 17.0% bromine at the rate of 4.4 ml/min. The column product was 41.6% zinc bromide and 0.14% bromine.

Example 3

Continuous Production of Zinc Bromide Solution from Zinc Metal, Bromine and Water Using Single Stage Reactor.

The apparatus consisted of a glass chromatography column, a mixing vessel, a heat exchanger and chemical metering pumps as shown in FIG. 2. The column used for this experiment was actually two commercially available chromatography columns joined together by a union adapter. Both sections had a 1-inch inside diameter. The lower section was 12-inch tall and the upper section was 24-inch tall. As in Examples 1 and 2, the column was filled with 3–5 mm zinc shot from Fisher Scientific.

The bottom of the column was fitted with an adapter that allowed liquids to be pumped into the column, but retained the zinc shot inside the column. The top of the column was fitted with an adapter that allowed gas and liquid to leave the column separately. The liquid was divided into recycle and product streams by an overflow separator. Feed samples were prepared by metering bromine and water into the mixing vessel. Recycle zinc bromide solution flowed by gravity from the top of the column into the mixing vessel. The mixing vessel was a commercially available round bottom flask sitting on a magnetic stir plate. The bromine and water were mixed with zinc bromide solution to completely dissolve the bromine. The solution of bromine, water and zinc bromide was pumped from the mixing vessel, through a heat exchanger and into the bottom of the column.

The mixing vessel was fed 3.9 g/min bromine and 2.4 g/min water and allowed to mix with recycled zinc bromide solution containing 59.5% zinc bromide. The recycle rate was approximately 232 ml/min. The resulting solution was 58.7% zinc bromide and 0.9% bromine. This solution was cooled to 51.5° C. by the heat exchanger and fed to the column at the rate of 237 ml/min. The column product contained 59.5% zinc bromide and 0.075% bromine.

Example 4

Production of Zinc Bromide Solution Using Two Stage Reactor.

The apparatus from Example 3 was modified to allow the recycle zinc bromide solution to be drawn from between lower and upper column sections as shown in FIG. 3.

The mixing vessel was fed 3.9 g/min bromine and 2.4 g/min water and allowed to mix with recycled zinc bromide solution containing 59.5% zinc bromide. The recycle rate was approximately 232 ml/min. The resulting solution was 58.7% zinc bromide and 0.9% bromine. The solution was cooled to 51.5° C. by the heat exchanger and fed to the column at the rate of 237 ml/min. The column product contained 59.5% zinc bromide and no detectable (less than 1 ppm) bromine.

REDUCED BROMINE ODOR AND COLOR

Bromine has a noxious, acrid odor, and the maximum health and safety exposure limit is currently 1 ppm in the air. Side by side sensory comparison of products from these examples showed noticeably lower bromine odor as the concentration of bromine in the product was reduced.

W. Manchot & F. Oberhauser reported in Z. Inorg. Chem. 139, 40–50 (1924) the following bromine vapor pressure data for bromine dissolved in potassium bromide solutions:

| KBr Concentration (%) | $Br_2$ Concentration (%) | Vapor Pressure (mm Hg) |
| --- | --- | --- |
| 1.2% | 0.78% | 13.6 |
| 5.6% | 0.75% | 2.5 |
| 10.6% | 0.71% | 1.7 |
| 19.2% | 0.64% | 1.3 |
| 32.2% | 0.54% | 1.2 |
| 37.3% | 0.50% | 1.2 |

Bromine vapor pressure generally decreased as the concentration of potassium bromide was increased. This is typical solvent/solute behavior. Bromine vapor pressure is very difficult to measure, but by extrapolation from this published data, we believe that bromine vapor pressure is also reduced by lower bromine concentration. Therefore, it is reasonable to include that products from this invention containing lower concentrations of bromine should also have lower bromine odor.

The product streams resulting from the method of this invention in Example 4 indicated high density zinc bromide solution free of appreciable color. Using the American Public Health Association color standard (APHA), the color index for resulting zinc bromide was approximately APHA 60.

The foregoing description is illustrative and explanatory of preferred embodiments of the invention, and variations in the size, shape, materials and other details will become apparent to those skilled in the art. It is intended that all such variations and modifications which fall within the scope or spirit of the appended claims be embraced thereby.

What is claimed is:

1. A method for making zinc bromide comprising:
   (a) dissolving bromine in an aqueous reaction solvent comprising a metal halide salt; and
   (b) contacting metallic zinc with the resulting bromine solution to form a zinc bromide solution essentially free of bromine.

2. The method of claim 1 wherein the metal of the metal halide salt is selected from the group consisting of alkali metals, alkaline earth metals, transition metals and combinations thereof.

3. The method of claim 2 wherein the metal of the metal halide salt is selected from the group consisting of sodium, potassium, calcium, zinc and a combination thereof.

4. The method of claim 1 wherein the halide of the metal halide salt is selected from the group consisting of chloride and bromide.

5. The method of claim 1 wherein the method temperature is maintained at less than about 60° C.

6. The method of claim 1 wherein the bromine is added continuously to the reaction solvent.

7. The method of claim 1 wherein at least a portion of the zinc bromide solution resulting from (b) is recycled to (a).

8. The method of claim 1 comprising the further step of concentrating the zinc bromide solution.

9. The method of claim 8 wherein the zinc bromide solution is concentrated until zinc bromide is precipitated.

10. The method of claim 8 wherein the zinc bromide solution is concentrated by evaporation.

11. The method of claim 8 wherein the percentage of zinc bromide in solution is increased by recycling the zinc bromide solution resulting from (b) continuously back to step (a).

12. A method for making zinc bromide comprising:
   (a) dissolving bromine in an aqueous reaction solvent;
   (b) feeding the reaction solvent resulting from step (a) to a reaction vessel containing metallic zinc;
   (c) contacting the metallic zinc with the reaction solvent to form a zinc bromide solution;
   (d) obtaining a zinc bromide product stream essentially free of bromine from the reaction vessel;
   (e) recirculating at least a portion of the zinc bromide product stream back to the reaction vessel as the reaction solvent in (a)–(c).

13. The method of claim 12 wherein bromine is dissolved in the presence of an aqueous solution of an additional halide ion.

14. The method of claim 12 wherein the reaction solvent comprises a base metal halide.

15. The method of claim 12 wherein the reaction vessel comprises a single stage reactor.

16. The method of claim 12 wherein the reaction vessel comprises at least two stages and the product stream from the first stage is recirculated back to step (a).

17. The method of claim 1 wherein the temperature of the method is controlled by continuously adding bromine to the reaction solvent at a rate that maintains the reaction temperature below the boiling point of bromine.

* * * * *